(12) United States Patent
Haller et al.

(10) Patent No.: US 6,457,952 B1
(45) Date of Patent: Oct. 1, 2002

(54) SCROLL COMPRESSOR CHECK VALVE ASSEMBLY

(75) Inventors: David K. Haller, Adrian, MI (US); Darrin S. O'Brien, Louisville, KY (US); Theodore A. Bernstein, Holly, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/707,359

(22) Filed: Nov. 7, 2000

(51) Int. Cl.[7] .......................... F04B 12/00; F04B 35/04; F01C 1/02; F16K 15/00
(52) U.S. Cl. .............. 417/410.5; 418/55.1; 137/533.27; 417/559
(58) Field of Search .............................. 417/410.5, 559; 418/55.1; 137/533.27, 533.21

(56) References Cited

U.S. PATENT DOCUMENTS

| 167,125 A | | 8/1875 | Ruhl ......................... 417/552 |
| 325,074 A | * | 8/1885 | Gordon ................. 137/533.19 |
| 1,315,727 A | * | 9/1919 | Howard ................. 137/543.13 |
| 2,195,292 A | | 3/1940 | Albertson .................... 251/119 |
| 3,530,880 A | | 9/1970 | Hune ....................... 137/515.5 |
| 4,325,680 A | | 4/1982 | Bar ............................ 417/569 |
| 4,560,330 A | | 12/1985 | Murayama et al. ........... 418/55 |
| 4,580,604 A | | 4/1986 | Kawaguchi et al. ........ 137/856 |
| 4,764,091 A | | 8/1988 | Ikeda et al. ................. 417/269 |
| 4,822,263 A | | 4/1989 | Nakajima et al. ........... 418/133 |
| 5,088,905 A | | 2/1992 | Beagle ....................... 418/55.1 |
| 5,090,880 A | | 2/1992 | Mashimo .................... 417/310 |
| 5,137,437 A | | 8/1992 | Machida et al. ........... 418/55.1 |
| 5,203,686 A | | 4/1993 | Scheldorf et al. ............. 418/63 |
| 5,273,068 A | * | 12/1993 | Duren ........................ 137/526 |
| 5,306,126 A | | 4/1994 | Richardson, Jr. ............... 418/1 |
| 5,342,183 A | | 8/1994 | Rafalovich et al. ........... 418/15 |
| 5,346,373 A | | 9/1994 | Riffe .......................... 417/415 |
| 5,451,148 A | | 9/1995 | Matsuzaki et al. ......... 418/55.1 |
| 5,452,989 A | * | 9/1995 | Rood et al. .................... 417/29 |
| 5,494,422 A | | 2/1996 | Ukai et al. ................. 418/55.1 |
| 5,496,160 A | | 3/1996 | Richardson, Jr. et al. .. 418/55.1 |
| 5,584,676 A | * | 12/1996 | Dreiman ..................... 417/569 |
| 5,800,141 A | | 9/1998 | Ceylan et al. ............. 418/55.1 |
| 5,921,761 A | | 7/1999 | Eckels ........................ 418/55.1 |
| 6,086,342 A | | 7/2000 | Utter ......................... 418/55.5 |

FOREIGN PATENT DOCUMENTS

JP    40-410 2772    4/1992    .......... F16K/15/16

* cited by examiner

Primary Examiner—Louis J. Casaregola
Assistant Examiner—Timothy P. Solak
(74) Attorney, Agent, or Firm—Baker & Daniels

(57) ABSTRACT

A compressor assembly including a housing, a compression mechanism disposed in the housing and having a discharge port, and a discharge check valve assembly. Gas substantially at suction pressure is received into the compression mechanism, compressed and discharged substantially at discharge pressure from the compression mechanism through the discharge port. The discharge check valve assembly has at least one elongate guide pin extending from the compression mechanism and a valve plate disposed about the guide pin. The valve plate has a closed position at a first position along the guide pin in which the valve plate covers the discharge port and an open position at a second position different than the first position along the guide pin in which the valve plate does not cover the discharge port. Gas substantially at discharge pressure and having been discharged from the compression mechanism is substantially prevented by the valve, in its closed position, from reentering the discharge port.

20 Claims, 3 Drawing Sheets

SCROLL COMPRESSOR CHECK VALVE ASSEMBLY

BACKGROUND OF THE INVENTION

The present invention relates to hermetic scroll compressors and particularly to discharge check valves therefor which are intended to prevent reverse rotation, or reverse orbiting motion, of the orbiting scroll member.

Hermetic scroll compressors generally include a sealed housing in which are disposed a compression mechanism and an electric motor having a stator and a rotor, the rotor being operatively coupled, through a shaft, to drive the somewhat planar orbiting scroll member of the compression mechanism. The orbiting scroll member is provided with a spiral or involute wrap extending from one side thereof, that wrap interleaved with a mating wrap which extends from the interfacing side of a somewhat planar fixed scroll member. The compression mechanism is provided with means, such as an Oldham coupling, to prevent rotation of the orbiting scroll member with the rotor. Refrigerant gas at substantially suction pressure is normally introduced into the compression space between the interleaved scroll wraps at a location near the radially outer edge of the fixed scroll member, and is compressed in crescent-shaped pockets or compression chambers partially defined by the interleaved scroll wraps as the orbiting scroll moves. The gas exits from between the scroll members at substantially discharge pressure through a discharge port provided near the radial center of, usually, the fixed scroll member. The discharge pressure gas is normally exhausted from the discharge port into a discharge pressure gas space defined by at least a portion of the compressor housing. Examples of prior scroll compressors are disclosed in U.S. Pat. Nos. 6,086,342, issued Jul. 11, 2000, U.S. Pat. No. 5,496,160, issued Mar. 5, 1996, U.S. Pat. No. 5,306,126, issued Apr. 26, 1994, and U.S. Pat. No. 6,139,294, issued Oct. 31, 2000, each of which is assigned to the assignee of the present application and expressly incorporated herein by reference.

One problem associated with prior scroll compressors relates to their being induced into reverse rotation or orbiting upon shutdown of the compressor as compressed refrigerant within the discharge pressure gas space expands and reversely flows back through the discharge port in the fixed scroll member. As the discharge pressure gas expands and backflows from the discharge pressure gas space into the compression space between the interleaved scroll wraps, the orbiting scroll is caused to orbit in the direction opposite that in which the gases were initially compressed. Thus, on shut down, the compressor may behave like an expansion motor, the compressed gases causing rotation of the driveshaft in a direction opposite that in which the electric motor normally drives the shaft. Moreover, in some scroll compressors, during periods of brief power interruption during which the compressor is caused to be reversely rotated by expanding discharge gases, the compressor may continue rotation in the reverse direction, driven by the motor, if power is restored to the motor while the compressor is still reversely rotating under influence of the expanding discharge gases. In such situations, the compressor may run in the reverse direction for quite some time. Objectionable noise and vibration usually accompany such reverse movement of the orbiting scroll, and if prolonged, such reverse movement may result in damage to the compressor.

Reverse rotation or orbiting in scroll compressors is a well known problem, and much effort has been made to preclude it. Previous scroll compressors have been provided with discharge check valves of various types provided over the discharge port to prevent reversely flowing discharge gases from reentering the space between the interleaved scroll wraps. These previous discharge check valves, however, often rely on the backflowing discharge gas to close them, which may slow their reaction time and lessen their reliability. Further, previous discharge check valves often require closely toleranced machining, or expensive tooling, and may include a multitude of component parts, which may result in high capitalized costs or substantial amounts of labor. Moreover, some prior discharge check valves are positioned such that, when open, they significantly block and undesirably restrict the outflow of gas from the discharge port. It is therefore desirable to provide a discharge check valve assembly for preventing reverse rotation or orbiting in a scroll compressor, which is both more reliable and less expensive than those previously known, and which does not significantly block or undesirably restrict the flow of gas from the compression mechanism.

SUMMARY OF THE INVENTION

The present invention addresses the shortcomings of previous compressor discharge check valve assemblies, and provides the above-mentioned desired advantages thereover.

The present invention provides a compressor assembly including a housing, a compression mechanism disposed in the housing and having a discharge port, and a discharge check valve assembly. Gas substantially at suction pressure is received into the compression mechanism, compressed and discharged substantially at discharge pressure from the compression mechanism through the discharge port. The discharge check valve assembly has at least one elongate guide pin extending from the compression mechanism and a valve plate disposed about the guide pin. The valve plate has a closed position at a first position along the guide pin in which the valve plate covers the discharge port and an open position at a second position different than the first position along the guide pin in which the valve plate does not cover the discharge port. Gas substantially at discharge pressure and having been discharged from the compression mechanism is substantially prevented by the valve, in its closed position, from reentering the discharge port.

The present invention also provides a compressor assembly including a housing, a compression mechanism disposed in the housing and having a discharge port, and a discharge check valve. Gas substantially at suction pressure is received into the compression mechanism, compressed and discharged substantially at discharge pressure from the compression mechanism through the discharge port. The discharge check valve assembly includes an elongate guide pin connected to the compression mechanism and having a longitudinal axis and a valve plate through which the guide pin extends and which substantially lies in a plane which is not parallel with the guide pin longitudinal axis. The discharge check valve assembly also includes means for limiting movement of the valve plate between a closed position in which the valve plate covers the discharge port and the plane is substantially normal to the guide pin longitudinal axis, and an open position in which the valve plate does not cover the discharge port and the plane is inclined relative to the guide pin longitudinal axis.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
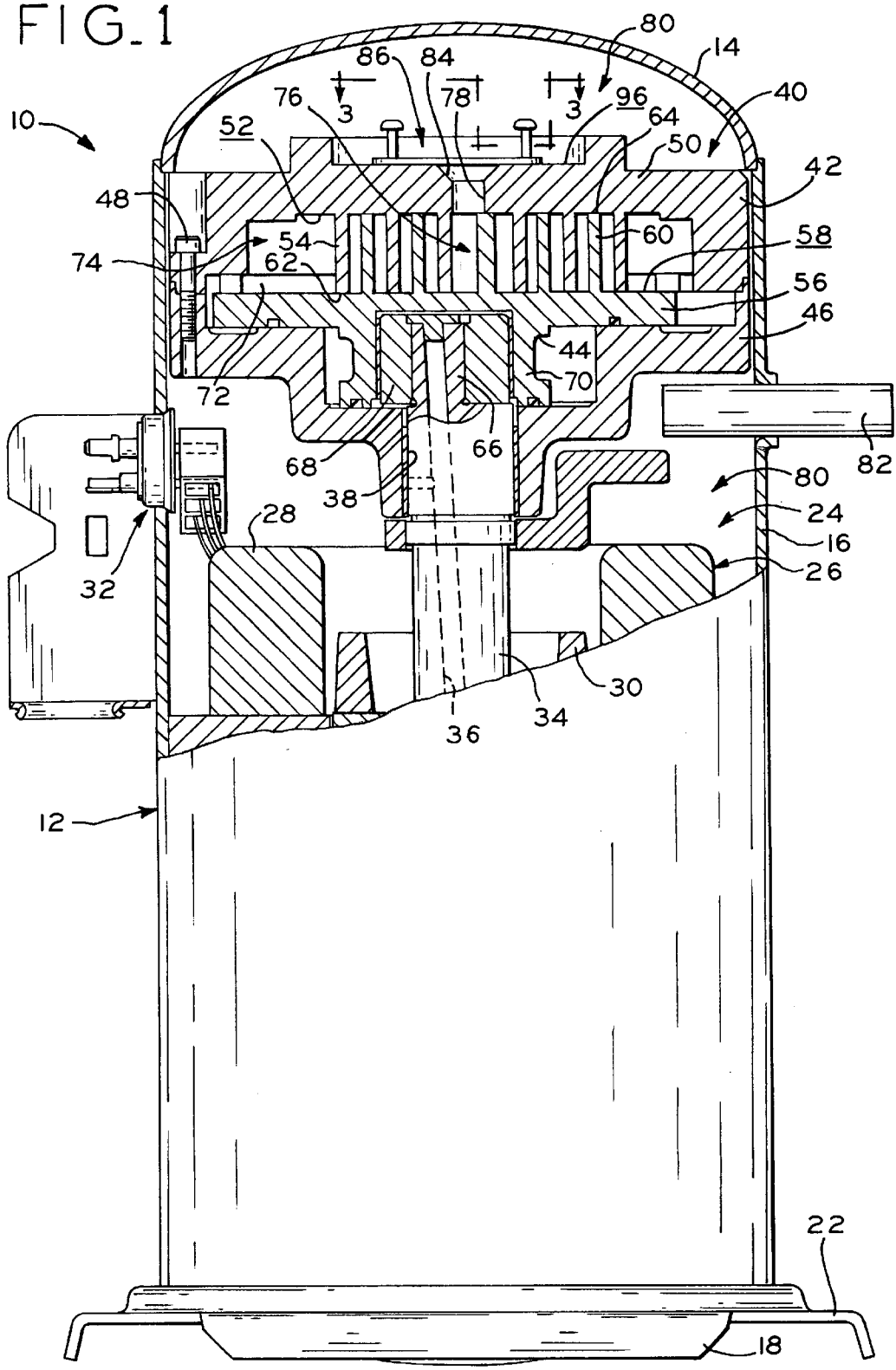
FIG. 1 is a partial sectional view of a scroll compressor in accordance with the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates various embodiments of the invention, and such exemplifications are not to be construed as limiting the scope of the invention in any manner.

DETAILED DESCRIPTION OF THE INVENTION

Referring to FIG. 1, scroll compressor assembly 10 is shown having housing 12 which includes upper portion 14, middle portion 16 and lower portion 18. Housing portions 14, 16 and 18 are hermetically secured together by a method such as welding or brazing. Mounting support 22 is fixed to housing 12 so as to mount compressor 10 in a vertical, upright position.

Motor 24 is disposed within housing 12 and includes stator 26 secured to housing portion 16 in any conventionally known manner. Notably, compressor assembly 10 is of the type referred to as a "high side" compressor; i.e., its motor 24 is exposed to a discharge pressure gas environment. Alternatively, motor 24 may be exposed to a suction pressure gas environment; such a compressor would be referred to as a "low side" compressor. Although the inventive discharge check valve assembly is shown as being adapted to a high side compressor, it is to be understood that it may be adapted to a low side compressor as well.

Annular stator 26 comprises windings 28 through which electrical current is passed in the well known way, via terminal cluster 32, and motor rotor 30 is rotatably disposed within the stator. As usual, rotor 30 has a central aperture through which extends driveshaft 34, which is fixed to rotate with the rotor by means of an interference fit. Shaft 34 is provided with longitudinal oil passage 36 and extends into an oil sump (not shown) located in a lower portion of housing 12. In any conventional way, oil is drawn or forced upwardly through passage 36 to main bearing 38 and other points of lubrication in scroll compression mechanism 40, which is driven by shaft 34.

Compression mechanism 40 includes fixed scroll member 42 and orbiting scroll member 44. Fixed scroll member 42 is secured to compressor frame 46 by a plurality of bolts 48. Fixed scroll member 42 includes generally planar portion 50 having flat face surface 52 from which extends involute fixed scroll wrap 54. Orbiting scroll member 44 includes generally planar portion 56 having flat face surface 58 from which extends involute orbiting scroll wrap 60. Tips 62, 64 of fixed and orbiting scroll wraps 54, 60, respectively, slidably engage flat face surface 56 or 52 of the other scroll member, and the lateral sides of the fixed and orbiting scroll wraps slidably engage each other, thereby defining a compression space between the interleaved scroll wraps. The compression space formed between the interleaved scroll wraps comprises a plurality of crescent-shaped pockets or compression chambers.

Shaft 34 is provided with eccentric portion 66 about which is disposed cylindrical bushing 68, which in turn is rotatably disposed within hub portion 70 of the orbiting scroll member. Bushing 68 may rotate relative to shaft 34 or, alternatively, may be rotatably fixed thereto. Oldham ring 72, of a type well known in the art, prevents the orbiting scroll member from rotating with shaft 34 or bushing 68, and constrains the orbiting scroll member's movement to one in which it orbits relative to the fixed scroll member.

Compressor assembly 10 may comprise part of a closed loop refrigeration system (not shown) which also includes a pair of heat exchangers, a flow restriction device therebetween, and refrigerant-conveying conduits. As is well known in the art, the suction pressure gas to be compressed by compressor assembly 10 is received from such a refrigeration system, and the compressed, discharge pressure gas expelled from the compressor assembly is returned to the system.

During compressor operation, refrigerant gas at substantially suction pressure is received from the refrigerant system and introduced, through a suction inlet tube (not shown) which extends through housing 12 and fixed scroll member 42, into suction pressure space 74 located between the interleaved scroll members, near their radially outer peripheries. The suction pressure gas is then compressed in the compression chambers to a higher, discharge pressure. The compressed refrigerant gas, substantially at discharge pressure, is then exhausted from discharge space 76 located between the interleaved scroll members, near their radial centers, through discharge port 78 provided in fixed scroll member 42. The gas exhausted through discharge port 78 is directed into discharge pressure space 80 defined by housing 12. The discharge pressure gas is discharged from space 80 and compressor assembly 10 through discharge tube 82 and returned to the refrigerant system. Notably, discharge port 78 may be chamfered or flared as at 84, enlarging the opening thereof. Chamfer 84 may serve as a diffuser which increases the pressure of the discharge gas as it flows from port 78. The cylindrical portion of port 78 is approximately 0.625 inch in diameter, and chamfer 84 extends approximately 0.200 inch axially therealong. The maximum diameter of chamfer 84, at the exit of port 78, is approximately one inch.

Figure 2:
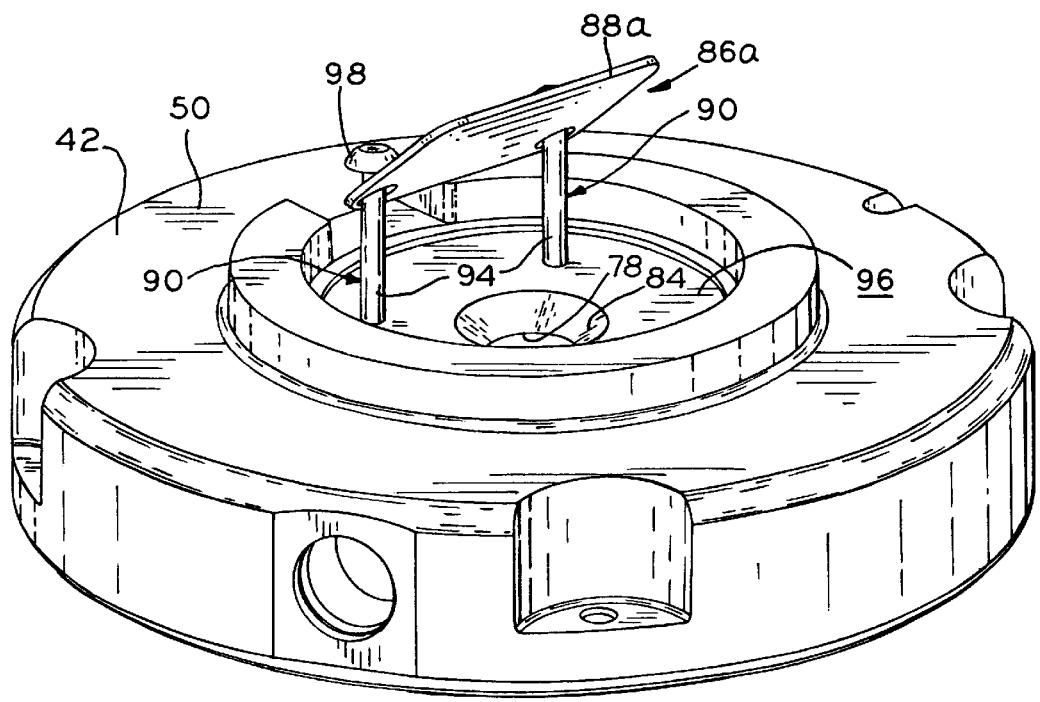
FIG. 2 is an oblique view of the fixed scroll member of the compressor shown in FIG. 1, showing a first embodiment of the inventive check valve assembly in its open position.
Figures 3A, 3B:
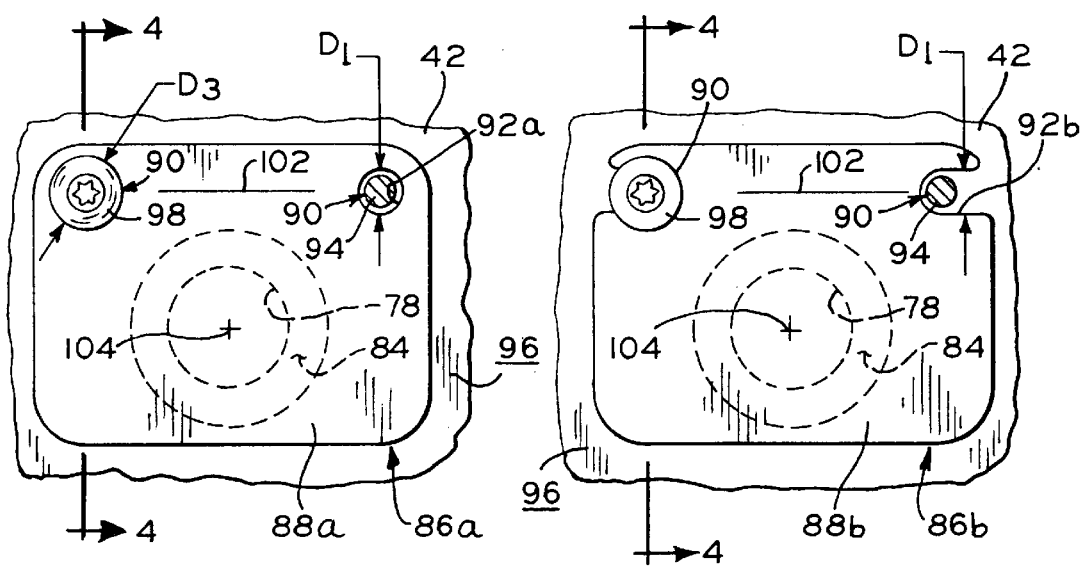
FIG. 3A is a fragmentary, partially sectioned view of the compressor assembly of FIG. 1 along line 3—3, showing the first embodiment of the inventive check valve assembly in its closed position.
FIG. 3B is a fragmentary, partially sectioned view of the compressor assembly of FIG. 1 along line 3—3, showing a second embodiment of the inventive check valve assembly in its closed position.
Figure 4:
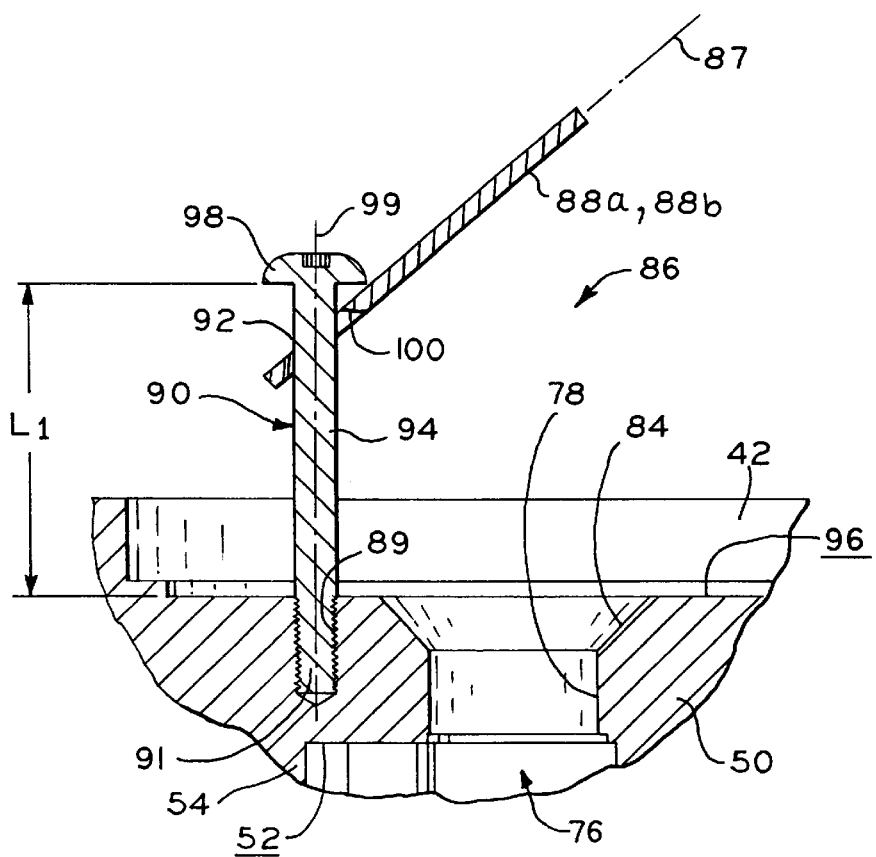
FIG. 4 is a fragmentary sectional side view of the compressor assembly of FIGS. 3A and 3B along line 4—4, showing the inventive check valve assembly in its open position.

Referring to FIGS. 2–4, positioned over discharge port 78 is discharge check valve assembly 86, which includes moveable, rigid flat plate 88, the lateral movement of which is restrained by a pair of guide pins 90. Valve plate 88 substantially lies in plane 87 (FIG. 4), plane 87 being moveable relative to fixed scroll member 42 and guide pins 90. Guide pins 90 may be comprised of bolts or screws having their threaded portions 91 engaged with threaded holes 89 provided in fixed scroll member 42. First embodiment check valve assembly 86a is shown in FIGS. 2 and 3A;

second embodiment check valve assembly 86b is shown in FIG. 3B. Functionally, check valve assemblies 86a and 86b operate the same way. Valve plates 88a and 88b are both approximately 2.0×1.5 inches in area, and approximately 0.0625 inch thick. Plate 88 may be a sheet steel stamping, but any other suitable, substantially rigid planar material is expected to suffice.

Figure 5:
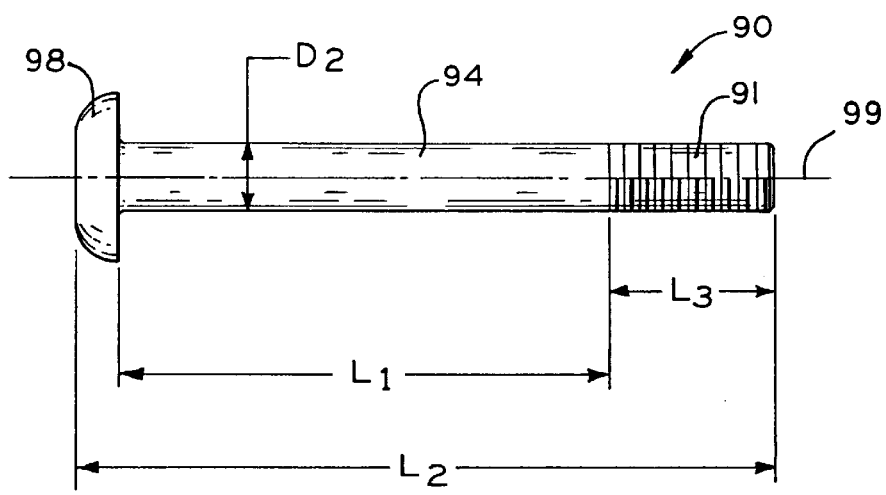
FIG. 5 is an enlarged side view of one embodiment of a guide pin of the inventive check valve assembly.

Referring first to check valve assembly 86a, plate 88a is provided with a pair of voids or circular apertures 92a having diametrical distance D1 (FIG. 3A) of approximately 0.231 inch, through which extend smooth, cylindrical guide pin portions 94. In the depicted embodiment, guide pin 90 is a cap screw. Diameter D2 (FIG. 5) of pin portion 94 is approximately 0.158 inch; length L1 (FIGS. 4, 5) of portion 94, between surface 96 of fixed scroll member 42 and head 98 of the guide pin, is approximately 1 inch. Head 98 has diameter D3 (FIG. 3A) of approximately 0.384 inch, and may be provided with a recess shaped for receiving an Allen key or a Torx driver (shown) for installation and removal thereof. Alternatively, head 98 may be provided with a hexagonal shape to be received in a socket wrench or driver. Notably, head diameter D3 is substantially greater than distance D1; movement of valve plate 88 along longitudinal axis 99 of each guide pin being limited by the head thereof. Also, the heads retain the valve plate onto the guide pins so that the valve plate cannot be inadvertently become disengaged from the guide pins. Cap screw has overall length L2 of approximately 1.60 inches; its threaded portion 91 has length L3 of approximately 0.375 inch (FIG. 5).

The difference between D1 and D2 is substantial; thus, valve plate 88 is loosely fitted onto guide pins 90. This loose fit allows the valve plate to freely open under the influence of outrushing discharge gas, and to travel freely upward along pin portions 94. This diameter difference also allows valve plate 88, when open, and plane 87 to assume the inclined or cocked position shown in FIGS. 2 and 4, wherein plane 87 and longitudinal axes 99 of the guide pins form an acute angle. As best seen in FIG. 4, the underside of valve plate 88a may be provided with chamfer 100 about each of apertures 92a to allow the valve plate to open even further without making the fit between the plate and the guide pins overly loose, thereby assuring the plate will fully cover discharge port 78 and its chamfer 84 in its closed position. In the closed valve position, the underside of valve plate 88 abuts surface 96 of the fixed scroll member, and longitudinal guide pin axes 99 are substantially normal to plane 87.

Referring to FIG. 3B, second embodiment check valve assembly 86b includes valve plate 88b which is identically sized and positioned relative to valve plate 88a of the first embodiment, but includes voids which are notches 92b instead of apertures 92a, the width of notches 92b also being distance D1. As in the first embodiment, the underside of valve plate 88b may be provided with a chamfer about these voids to expand the amount by which the valve assembly may open without affecting the looseness of its fit on the guide pins, thereby ensuring the discharge port and its chamfer will be properly covered in the closed position.

With reference to FIGS. 3A and 3B, it will be noted that both guide pins 90 lie on line 102 which extends therebetween, and that line 102 is substantially offset from axial centerline 104 of discharge port 78; indeed, line 102 lies completely outside the periphery of discharge port 78 and its chamfer 84. Such positioning of the guide pins relative to the discharge port (and its chamfer, if any) ensures that valve plate 88 will pivotally open to an extent at which it provides little or no obstruction to gas outflowing from discharge port 78, and assume a stable, cocked open position abutting guide pin portions 94, thereby preventing rattling of the valve plate on the guide pins during normal compressor operation. As noted above, chamfer 84 may serve as a diffuser which increases the pressure of the discharge gas as it flows from port 78. The increased discharge pressure afforded by chamfer 84 may help to hold the open valve plate into its abutting engagement with guide pin portions 94.

The valve plate of the inventive check valve assembly is held open only by the force of the discharge gas impinging thereof, and closes, upon shutdown of compressor 10, under the influence of gravity. In its closed position, valve plate 88 lies against fixed scroll member surface 96, completely covering discharge port 78 and its chamfer 84 and blocking the reverse flow of compressed gas back into the space between the interleaved scroll wraps. Gas substantially at discharge pressure in space 80 is thus prevented by the closed valve plate from reentering discharge port 78 and consequently causing reverse rotation or orbiting of the compressor assembly.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A compressor assembly comprising:
   a housing;
   a compression mechanism disposed in said housing and having a discharge port, gas substantially at suction pressure received into said compression mechanism being compressed and discharged substantially at discharge pressure from said compression mechanism through said discharge port; and
   a discharge check valve assembly comprising at least one elongate guide pin extending from said compression mechanism and a valve plate disposed about said guide pin, said valve plate having a closed position at a first position along said guide pin in which said valve plate covers said discharge port and an open position at a second position different than said first position along said guide pin in which said valve plate does not cover said discharge port, whereby the gas substantially at discharge pressure and having been discharged from said compression mechanism is prevented by said valve, in its said closed position, from reentering said discharge port, and wherein said valve plate has a cocked position in its said open position.

2. The compressor assembly of claim 1, wherein said compression mechanism comprises a fixed scroll member and an orbiting scroll member each having wraps, said wraps being interleaved, the gas substantially at suction pressure being compressed between said interleaved wraps.

3. The compressor assembly of claim 2, wherein said discharge port is in said fixed scroll member, said at least one elongate guide pin extending from said fixed scroll member.

4. The compressor assembly of claim 1, wherein said valve plate has a void, and said guide pin extends through said void.

5. The compressor assembly of claim 4, wherein said void is an aperture.

6. The compressor assembly of claim 4, wherein said void is a notch.

7. The compressor assembly of claim 1, wherein said valve plate is substantially rigid.

8. The compressor assembly of claim 1, wherein said discharge port has an axial centerline, said valve assembly includes a pair of guide pins, and a line extending between said guide pins is offset from said axial centerline.

9. The compressor assembly of claim 1, wherein said valve plate has a void, said guide pin extends through said void, and portions of said valve plate about said void abut said guide pin in said open position.

10. The compressor assembly of claim 9, wherein said guide pin has a cross sectional diameter which is substantially smaller than a distance across said void.

11. The compressor assembly of claim 9, wherein said valve plate has a chamfer about said void, and a portion of said chamfer abuts said guide pin in said open position.

12. The compressor assembly of claim 1, wherein said guide pin is provided with a head, movement of said valve plate axially along said guide pin being limited by said head.

13. The compressor assembly of claim 1, wherein said valve plate open position is assumed in response to the impingement of gas discharged from said discharge port on said valve plate.

14. A compressor assembly comprising:
a housing;
a compression mechanism disposed in said housing and having a discharge port, gas substantially at suction pressure received into said compression mechanism being compressed and discharged substantially at discharge pressure from said compression mechanism through said discharge port;
a discharge check valve assembly comprising: an elongate guide pin connected to said compression mechanism and having a longitudinal axis; a valve plate through which said guide pin extends and which substantially lies in a plane which is not parallel with said longitudinal axis; and means for limiting movement of said valve plate between a closed position in which said valve plate covers said discharge port and said plane is substantially normal to said longitudinal axis, and an open position in which said valve plate does not cover said discharge port and said plane is inclined relative to said longitudinal axis.

15. The compressor assembly of claim 14, further comprising means for limiting the movement of said valve plate along said longitudinal axis.

16. The compressor assembly of claim 15, comprising two said guide pins, said guide pins having a line extending therebetween which does not extend over said discharge port.

17. A compressor assembly comprising:
a housing;
a compression mechanism disposed in said housing and having a discharge port, gas substantially at suction pressure received into said compression mechanism being compressed and discharged substantially at discharge pressure from said compression mechanism through said discharge port; and
a discharge check valve assembly comprising at least one elongate guide pin extending from said compression mechanism and a valve plate disposed about said guide pin, said valve plate having a void through which said guide pin extends, said valve plate having a chamfer about said void, said valve plate having a closed position at a first position along said guide pin in which said valve plate covers said discharge port and an open position at a second position different than said first position along said guide pin in which said valve plate does not cover said discharge port, whereby the gas substantially at discharge pressure and having been discharged from said compression mechanism is prevented by said valve, in its said closed position, from reentering said discharge port.

18. The compressor assembly of claim 17, wherein said chamfer is located on an underside of said valve plate.

19. A compressor assembly comprising:
a housing;
a compression mechanism disposed in said housing and having a discharge port, said discharge port having an axial centerline, gas substantially at suction pressure received into said compression mechanism being compressed and discharged substantially at discharge pressure from said compression mechanism through said discharge port; and
a discharge check valve assembly comprising:
at pair of guide pins extending from said compression mechanism, a line extending between said guide pins being offset from said discharge port axial centerline and not extending over said discharge port, and
a valve plate disposed about said guide pins, said valve plate having a closed position at a first position along said guide pin in which said valve plate covers said discharge port and an open position at a second position different than said first position along said guide pin in which said valve plate does not cover said discharge port, whereby the gas substantially at discharge pressure and having been discharged from said compression mechanism is prevented by said valve, in its said closed position, from reentering said discharge port.

20. The compressor assembly of claim 19, wherein said discharge port has an outlet provided with a chamfer, and said line extending between said guide pins does not extend over said chamfer.

\* \* \* \* \*